United States Patent

Simon

[11] 4,018,700
[45] Apr. 19, 1977

[54] CHROMATED ALKALINE EARTH SALTS OF BIS(S-DIPHENYLGUANIDINIUM BENZENEPHOSPHONATE) FOR THE CORROSION-INHIBITION OF ALUMINUM AND FERROUS ALLOYS

[76] Inventor: Eli Simon, 7175 Little Harbor Drive, Huntington Beach, Calif. 92648

[22] Filed: Mar. 17, 1976

[21] Appl. No.: 667,600

[52] U.S. Cl. .................. 252/389 A; 252/400 A; 260/438.5 R; 106/14
[51] Int. Cl.² .................................. C23F 11/00
[58] Field of Search .............. 252/389 A, 400 A; 260/438.5 R, 429 CY; 21/2.7 A; 106/14

[56] References Cited

UNITED STATES PATENTS 3,630,938  12/1971  Troscinski ............... 252/389 A X

OTHER PUBLICATIONS

Chemical Abstracts 77, (1972), 116/75e, "Removable Anticorrosive Coatings for Metals."
Chemical Abstracts 78, (1973), 99122m, "Inhibited Coatings as an Agent for the Temporary Protection of Metals from Corrosion."
Chemical Abstracts 82, (1975), 5431u, "Improving the Protective Properties of Alkyl Coatings Inhibited by Guanidine Chromate".

Primary Examiner—Benjamin R. Padgett
Assistant Examiner—E. Suzanne Parr

[57] ABSTRACT

A compound for inhibiting the corrosion of aluminum and ferrous alloys, and a sequential three-stage method of producing it, comprising as reactants the ratios of: 2-moles of s-diphenylguanidine; 2-moles of benzenephosphonic acid; 1-mol of an alkaline earth oxide, selected from the oxides of calcium, zinc, and strontium; and 2-moles of chromium trioxide. In the first stage, 1-mol of s-diphenylguanidine, or (s-DPG), is reacted with 1-mol of benzenephosphonic acid, or (BPA), to produce the addition product salt diphenylguanidine monobenzenephosphonic acid, the diphenylguanidine acting as a monoacidic base; this is identified molecularly as (s-DPG)$_1$(BPA)$_1$, conceptualized structurally as

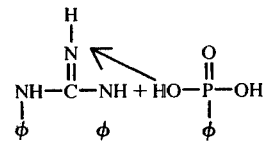

In the second stage, 2-moles of the addition product salt of stage-1 is reacted with 1-mol of an alkaline earth oxide to produce the alkaline earth salt of bis(s-diphenylguanidinium benzenephosphonate) by condensation; for calcium oxide as the alkaline earth oxide, this is identified molecularly as

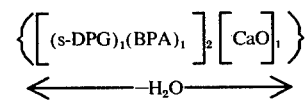

and conceptualized structurally as

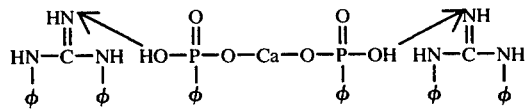

In the third stage, 1-mol of the alkaline earth oxide condensation salt of stage-2 is reacted with 2-moles of chromium trioxide; for calcium oxide as the alkaline earth oxide, this is identified molecularly as in the following,

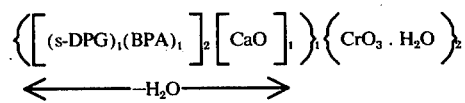

and conceptualized structurally as

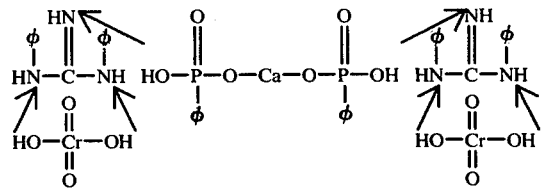

It will be understood that the conceptualized structures of the reaction products in each of the stages is for the purpose of visualization only, and is not meant as limiting the novelty and/or the efficacy of the corrosion-inhibitive product of this invention.

3 Claims, No Drawings

CHROMATED ALKALINE EARTH SALTS OF BIS(S-DIPHENYLGUANIDINIUM BENZENEPHOSPHONATE) FOR THE CORROSION-INHIBITION OF ALUMINUM AND FERROUS ALLOYS

BACKGROUND OF THE INVENTION

This invention relates to a novel composition which combines in a single product the corrosion-inhibiting characteristics of the guanidinium, phosphonate, alkaline earth cation, and chromate ions having a pH and solubility in aqueous solutions compatible with aluminum and ferrous alloys and organo-polymeric binders.

There are many pigments which will enhance, in varying degrees, the protection of aluminum and ferrous surfaces against the encroachment of corrosive attack in humidified atmospheres, aqueous and saline solutions. These, for instance, include the chromates, molybdates, phosphates, and oxides of zinc, calcium, strontium, barium, cobalt, lead, etc., and are generally rather specific in their action depending on the particular mechanism of inhibition involved; but, for more generalized use, it requires a mixture of pigments to provide a broader spectrum of corrosion protection. This invention is unique in that its components may synergistically reinforce the protective characteristics by broadening the mechanism of inhibition; in addition, the aqueous solubility of the product is adequate for leaching from an organo-polymeric binder, thereby protecting against the encroachment and spread of the corrosive attack as well as for incorporation in aqueous and saline solutions to inhibit the attack on exposed aluminum and ferrous alloy surfaces in an equipment or systems-oriented construction.

SUMMARY OF THE INVENTION

It is an object of the subject invention to provide a product having improved corrosion-inhibitive characteristics for the protection of aluminum and ferrous alloy metals, when incorporated in an organo-polymeric binder or dissolved in aqueous and/or saline solutions.

Another object of the subject invention is to identify the method of preparation of the improved product, which is accomplished sequentially in three stages.

DESCRIPTION OF THE INVENTION

Stage I — reaction comprises the preparation of the addition product salt between s-diphenylguanidine (s-DPG) and benzenephosphonic acid (BPA) in a mol ratio of 1:1. The following procedure is illustrative:

1. 1.581 g. benzenephosphonic acid (1/100 mol) is dissolved in approximately 20 ml. distilled water.
2. 2.113 g. s-diphenylguanidine (1/100 mol) is dissolved in approximately 20 ml. isopropanol heated to about 40° C.
3. The aqueous benzenephosphonic acid solution is added to the alcoholic s-diphenylguanidine producing a single phase, compatible solution.
4. Partial evaporation by heating the solution to approximately 80° C. will seed the solution, with profuse crystallization when cooled; after seeding, sufficient distilled water is added so that when the mixture is heated to about 100° C., complete re-solubilization occurs.

Recovery of the salt from step-3, by evaporation and heating to constant weight at 120° C., indicated addition-product with a calculated molecular weight of 369.4, having a pH in saturated distilled water (at ambient temperature) of about 5.6, and an aqueous solubility (g/100 ml. solution) of 1.3 at approximately 20° C. Stage-I salt is categorized as s-diphenylguanidine monobenzenephosphonic acid, and represented by $(s-DPG)_1(BPA)_1$, as noted under the section "Abstract Of The Disclosure".

Stage II — comprises the condensation reaction between the addition product salt of Stage-I and an alkaline earth oxide, in a mol ratio of 2 moles of the s-diphenylguanidine monobenzenephosphonic acid:1 mol of an alkaline earth oxide. Selecting calcium oxide as representative from the oxides of calcium, zinc, and strontium, the following procedure is illustrative:

1. 0.280 g. of calcium oxide (1/200 mol) is dispersed in about 15 ml. distilled water, and when added to the hot solution of Stage-I (step-2) precipitation occurs.
2. The mixture is concentrated by evaporation at less than 100° C. to remove the isopropanol.

Recovery of the salt from step-2 (Stage-II) indicated the reaction to be one of condensation, with a calculated molecular weight of 776.8, or [(2×369.4)+56-18], having a pH in a saturated distilled water solution of approximately 7.2, and an aqueous solubility (g/100 ml. solution) of 2.55 at approximately 20° C.

Stage-II salt is identified as calcium bis(diphenylguanidinium benzenephosphonate), and, as previously noted, is represented by:

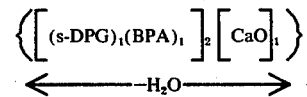

Stage-III — concludes the sequential reactions and involves chromating the salt from Stage-II with an aqueous solution of chromium trioxide in the mol ratio of 1-mol of salt from Stage-II: 2-moles $CrO_3$. The following procedure is illustrative:

1. 1.000 g. (1/100 mol) $CrO_3$ is dissolved in about 15 ml. distilled water.
2. 100 ml. distilled water is added to the mixture of Stage-II (step-2), which contains the equivalent of 1/200 mol of the product, calcium bis (diphenylguanidinium benzenephosphonate); when heated to boiling, the mixture remained cloudy.
3. Addition of aqueous chromic acid solution to the above (step-2) mixture effected complete solubilization.

The chromated salt was recovered by removal of the solvent at approximately 100° C. The pH of its saturated solution in distilled water was about 5.7, and its solubility in distilled water (g/100 ml. solution) was approxomately 0.5 at 20° C.

The recovered salt is identified as calcium dibenzenephosphonate bis (diphenylguanidinium chromate), and, as previously noted, is represented by

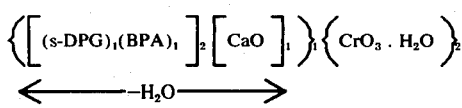

and as the following composite assuming addition of acidic hydrogens from benzenephosphonic acid to the s-diphenylguanidine, liberation of 1-mol of water of condensation between 1-mol of alkaline earth oxide and 2-moles of Stage-I addition salt, and addition-chromating of 1-mol of Stage-II salt and 2-moles of aqueous chromium trioxide.

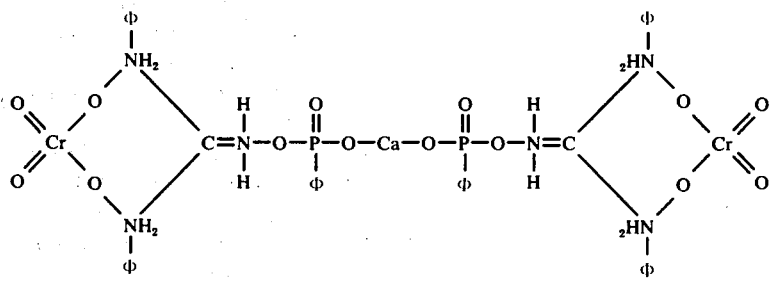

EXAMPLES OF THE INVENTION

Example 1 — "Corrosion-Inhibition, Aluminum Alloy In Saline Solution"

Acetone-cleaned, bare 7075 T-6 aluminum alloy strips were immersed in saline solutions containing 3 g. NaCl in 100 ml. of tap water. Within 24 hours, the specimen in the uninhibited solution was pitted, and flocculent, hydrated aluminum oxide had formed; within one week, the specimen had been destructively attacked, and after eight months, much of the metal had been consumed and converted to the hydrated oxides. In contrast, the specimen in the saline solution containing the chromated salt of this invention to the extent of approximately 0.02 g. as $CrO_4$/100 ml. salt solution remained bright, shiny, and pit-free after eight months of immersion.

Example 2 — "Corrosion-Inhibition, Paint-Coated Aluminum and Ferrous Alloys"

The chromated pigment of this invention was mortar/pestle ground into a white, synthetic enamel at a pigment loading of approximately 14 wt.% of the total solids content. Substrates of clad 7075 T-6, bare low alloy steel, and zinc-coated iron pipe were painted with enamel, with and without inhibitor incorporated. In this test, the objectives were to determine, 1) whether the chromated inhibitor would add to the protection of the normally corrosion-inhibited substrates of the clad 7075 T-6 and the zinc-coated iron, and 2) the leaching effectiveness in preventing attack on the bare low alloy, corrosion-susceptible steel. All of the specimens were exposed outdoors on a wooden rack at an angle of about 45°, and were wetted each day, alternating with tap water and 3% sodium chloride solution. After one week: The bare low alloy steel was severly rusted in the scribed marks, corrosion had encroached under the paint, and most of the painted surface was stained with the products of corrosion; in contrast, the scribed lines of the inhibited specimen remained clean, and the paint unchanged. After six months: For the zinc-coated pipe, the uninhibited specimen showed considerably more damage (than the "inhibited" pipe) with regard to paint peeling and lifting away from the scribed marks, and in the more general distribution of rust spots; for the clad 7075 T-6, the uninhibited specimen showed corrosive attack in the scribed lines, as well as paint blistering and peeling, in contrast to the inhibited sample which remained substantially unchanged.

I claim:

1. An inhibitor for retarding the corrosion of aluminum and ferrous alloys prepared by a three-stage sequential series of reactions conducted in aqueous solutions, the first stage comprising an addition reaction between 1-mol of s-diphenylguanidine and 1-mol of benzenephosphonic acid, the second stage the condensation reaction between 2-moles of the first stage addition-product salt and 1-mol of an a metal oxide selected from calcium, zinc, and strontium, and the third stage the chromating reaction between 1-mol of the second stage metal oxide condensation product and 2-moles of chromium trioxide.

2. The inhibitor of claim-1 in which the metal earth oxide is calcium oxide.

3. A method of retarding corrosion of aluminum and ferrous alloy substrates by using the inhibitor of claim-1 as a pigment in organo-polymeric binders.

* * * * *